UNITED STATES PATENT OFFICE.

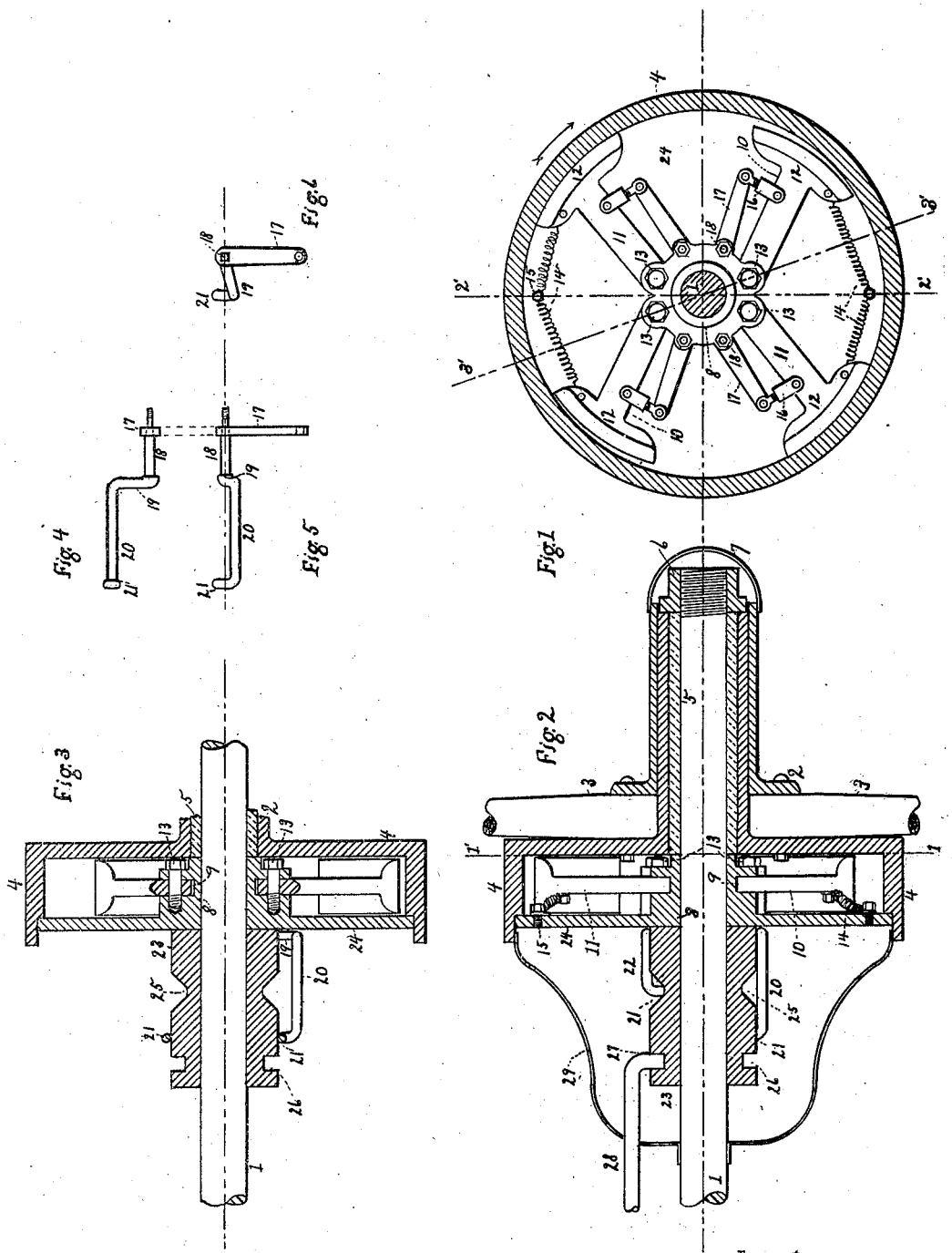

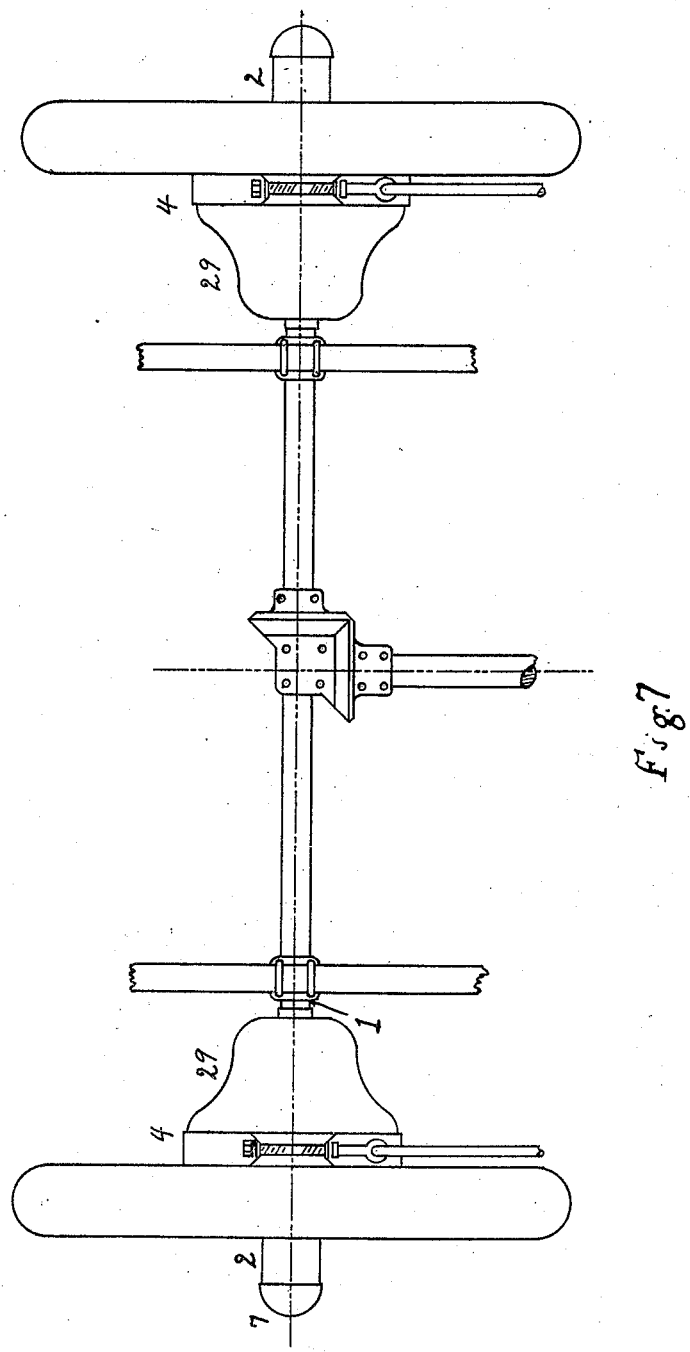

LAFAYETTE M. OSBORN AND JAMES E. MANNIS, OF TOPEKA, KANSAS.

COMPENSATING MECHANISM.

No. 844,462.      Specification of Letters Patent.      Patented Feb. 19, 1907.

Application filed March 6, 1906. Serial No. 304,525.

*To all whom it may concern:*

Be it known that we, LAFAYETTE M. OSBORN and JAMES E. MANNIS, citizens of the United States, residing at Topeka, in the county of Shawnee and State of Kansas, have invented new and useful Improvements in Compensating Mechanism, of which the following is a specification.

Our invention relates to the compensating mechanism for the rear or drive axle of automobiles and the like, such mechanism being adapted to compensate for the unequal travel of the two wheels, as in turning corners. Such compensating is necessary, because the unequal travel of the wheels in turning a corner would cause one of the wheels to slip on account of the difference in travel were the two wheels rigidly secured to a solid axle. In other words, the compensating gear is primarily for the purpose of saving the tires, the most expensive elements in point of maintenance in an automobile.

Objects of the present invention are to provide a practicable compensating mechanism which may be used with a solid drive-axle, to provide such a device which may be used with a solid axle and in combination with the ordinary standard wheel used on automobiles without material alteration of the wheel, to provide such a device in which the wheel may be mounted loosely on the axle and in which the wheel may be readily removed or replaced and in which the mechanism itself may be readily gotten at, to provide such a mechanism which is positively brought into operation and which does not depend either upon friction or upon the absence of friction to bring the clutches into operation, to provide such a mechanism which contains no "floating" element, to improve generally upon such mechanisms, to provide a compensating mechanism which is small, compact, efficient, cheaply made, and easily gotten at, and to provide the various mechanisms hereinafter set forth in detail.

The invention consists of the parts, improvements, and combinations herein set forth and claimed.

In the drawings accompanying and forming part of this specification and in the description thereof we have shown the invention in its prefered form and have shown the best mode of applying the principles thereof; but it is to be understood that the invention itself is not to be confined to these drawings and the description of the drawings; that it may be applied to other uses; that parts and combinations thereof, as herein separately claimed, may be used with or without other connecting parts of similar general nature to those herein described, and that we contemplate changes in form, proportions, materials, arrangement, the transposition of parts, and the substitution of equivalent members without departing from the spirit of the invention.

Figure 1 is a view in cross-section, through 1' 1' of Fig. 2, of the clutch mechanism applied to each wheel. Fig. 2 is a longitudinal section through 2' 2' of Fig. 1. Fig. 3 is a longitudinal section through 3' 3' of Fig. 1. Figs. 4, 5, and 6 are various detail views of one of the levers by which the brake-shoes are thrown out of and into engagement with the friction-drum. Fig. 7 is a plan view, on a reduced scale, of the rear or drive axle of an automobile with our improvement applied to each wheel thereof and showing more clearly that the axle may be made solid throughout its length, any suitable driving connections being used, here shown as miter-gears.

Like reference-numerals indicate like or corresponding parts throughout the several views.

1 represents one end of the rear axle of an automobile, by which the car is driven.

2 may represent the hub of an ordinary standard automobile-wheel.

3 are the spokes, and 4 is a drum forming part of the hub and commonly used for braking purposes on many of the standard wheels.

5 is a suitable bushing.

6 is the nut, and 7 is a cap.

The wheel is mounted loosely on the shaft and is held in place by the nut.

A hub 8 is shrunk or keyed or otherwise suitably secured on the axle adjacent to the wheel-hub and within the drum 4. Extending around this hub is a groove or channel 9, in which are pivoted, by means of cap-screws 13 13, the inner ends of the arms 10 10 11 11, having at their outer ends the brake-shoes 12 12 12 12, respectively, adapted to engage the friction-drum 4, as will be hereinafter fully explained. These shoes are rigidly secured to or integrally made with the links or arms 11 11 10 10. For each arm or shoe there is a spring 14, fastened to the extension or flange 24 of the hub 8, which spring tends normally to hold the shoe in engagement with the drum. To each arm 11 is secured a link 16, which connects it to the outer end of an arm 17, the inner end being set on a pin or rod 18, pivotally mounted in said hub and extending out, turning first outwardly at right angles to the shaft, as indicated by 19, thence extending parallel with the shaft 20, and finally turning inwardly toward the shaft 21. A collar or sleeve 23 is mounted on the shaft adjacent to the hub 8 and has a channel or groove 25, whose sides are beveled or slanting, as shown. It also has another groove 26, in which may work a yoke or collar on the end 27 of the operating-rod 28, whereby the sleeve is movable to and fro longitudinally on the shaft. By reference to Fig. 2 it will be noted that one of the operating-levers therein shown is a short one 22, while the other is a long one 20. They are so arranged that when the sleeve is in the position shown in the drawings the inturned end 21 of the short rod or operating-lever 22 is permitted to fall into the groove 25, and the end of the long lever-rod 20 rides on the outer or higher surface of the sleeve; but if the sleeve be drawn to a secondary position by rod 28 the inturned end of rod 22 will ride on the higher surface of the sleeve, while the end of the longer rod 20 will ride in the groove. At the half-way point both rods will ride on the outer or higher surface, neither being in the groove. By reference in particular to Fig. 1 it will be noted that the four arms and brake-shoes are arranged in two pairs—one pair being in engagement with the drum and the other pair standing disengaged therefrom; that the members of each pair are arranged on opposite sides of the shaft; that the arms of the brake-shoes form a sort of elbow or toggle-joint connection with the hub 8, whereby by the rotation of the hub in the proper direction, with the shoe against the drum, it will take a firm hold thereof and carry the drum with it; but upon the rotation of the hub in the reverse direction or by revolving the drum in a relatively opposite direction the shoe will release its hold and permit the shaft or the drum to rotate independently. The joints of the two pairs are oppositely arranged, the shoes of one pair being adapted to engage the drum when the axle is turning in one direction and to release when turning in the other direction, while the shoes of the other pair engage and release in just the opposite manner. Arms 10 10 are controlled by the operating-lever having the longer rods 20 20, whose ends are shown to be riding on the higher surface of the sleeve, while the arms 11 11 are controlled by the shorter rods, whose inturned ends are shown as riding in the groove 25. It is now evident that the purpose of these operating-rods and their control by the sleeve is merely to throw either one or the other of the pairs of shoes out of engagement with the drum and against the tension of the springs 14 14, which tend to throw them into engagement. Thus as the longer lever-rods 20 20 ride on the higher surface of the sleeve they throw the arms 10 10 and their shoes out of engagement with the drum, while the rods 22 22, which ride in the groove, permit the springs 14 14 to draw the shoes of arms 11 11 into engagement with the drum, while the turning of the shaft in the direction of the arrow tends only to tighten the grip and will always carry the drum and wheel with it; but by turning the shaft in the opposite direction the hold of the shoes will be released. If now we shift the sleeve so as to drop rods 20 into the groove and raise rods 22 22 out of it and then rotate the shaft in the direction of the arrow, the drum will not be carried along; but upon reversing the direction of rotation of the axle the arms 10 10 will force their shoes into firm contact with the drum. If we stop the sleeve at the half-way point, none of the shoes will engage the drum, thereby making the shaft and wheel entirely independent of each other.

In practice we contemplate the use of a clutch such as we have here shown on each wheel of the rear axle. Also the controlling or reversing sleeve may be operated by hand independently of all other mechanism or by the same mechanism which controls the engines, or otherwise it may be operated wholly or partly automatically and may be inclosed by a casing or shield 29. Obviously in turning a corner the outer wheel which runs the faster will be permitted to turn independently of the shaft, having the same relation thereto as if the shaft in Fig. 1 were stationary and the wheel were revolving in the direction of the arrow, while the car will be driven by the inside wheel. In coasting, both wheels may run independently of the shaft if the engine be stopped or if the speed of the car exceeds that of the engine. To take off the wheel, the sleeve may be placed at the half-way point, which withdraws all shoes from the drum, when the wheel may be removed in the usual manner of removing a loose wheel. The entire mechanism of the clutch may also thus easily be gotten at by removing the wheel. The axle itself may be solid from one end to the other and the use of truss-rods wholly avoided, and the driving power may be applied to the axle direct. We do not require that the axle itself be threaded or otherwise tampered with or weakened, and it will be noted that we furnish a straightaway pull through the clutch mechanism and avoid all side strain. The outer face of the drum may still be used for braking purposes by means of a band or any other suitable device.

It is possible to use our clutch without the springs 14 14, as the centrifugal force will throw the shoes into engagement with the drum; but we prefer to use the springs in connection with our invention, as they serve to make the parts respond more quickly and to be more positive in their action.

What we claim is—

1. In a compensating mechanism, the combination with the drive-shaft of a motor-vehicle and a wheel loosely mounted thereon, of a drum secured to the wheel, a number of friction-shoes with reversely-arranged toggle-joint connections between the shaft and the shoes, and means for positively withdrawing either or both sets of shoes from engagement with the drum.

2. In a compensating mechanism, the combination with the drive-shaft of a motor-vehicle and a wheel loosely mounted thereon; of a drum secured to the wheel, a hub secured to the shaft, reversely-arranged toggle-joints and friction-shoes, springs tending naturally to force said shoes into engagement with the drum, and means for positively withdrawing either set of friction-shoes from engagement with the drum.

3. In a compensating mechanism, the combination with the drive-shaft of a motor-vehicle and a wheel loosely mounted thereon; of a drum secured to the wheel, a hub secured to the shaft, reversely-arranged toggle-joints and friction-shoes, springs tending to force said shoes into engagement with the drum, and means for positively withdrawing either or both sets of shoes from engagement with the drum.

4. In a compensating mechanism, the combination with the drive-shaft of a motor-vehicle and a wheel loosely mounted thereon; of a friction clutch mechanism between the shaft and the wheel comprising reversely-arranged toggle-joints and friction-shoes, and means for operating same.

5. In a compensating mechanism, the combination with the drive-shaft of a motor-vehicle and a wheel loosely mounted thereon; of a friction clutch mechanism between the shaft and the wheel exerting its force substatially at right angles to the shaft, and means independent of the operation of the wheel or shaft for operating said clutch.

6. In a compensating mechanism, the combination with the drive-shaft of a motor-vehicle, a traction-wheel, a drum secured to the wheel, a hub secured to the shaft, friction-shoes secured to the hub by toggle-joint connections, said shoes being rigidly secured to the adjoining members, respectively, of the toggle-joints, said joints being oppositely arranged for the different shoes, and means for engaging said shoes with said drum and for disengaging them therefrom.

7. In a compensating mechanism, the combination with the drive-shaft of a motor-vehicle, a traction-wheel; of a friction-clutch mechanism between the shaft and the wheel comprising a drum secured to one of said members and friction-shoes secured to the other of said members by toggle-joints adapted to move in a plane substantially at right angles to the shaft, some of said joints being arranged so as to face oppositely to others, and means for engaging one set of friction-shoes with the drum and disengaging the other set, for disengaging the first set and engaging the second, and for disengaging both sets; each shoe being rigidly secured to the adjoining member of the toggle-joint.

8. In a compensating mechanism, the combination with the drive-shaft of a motor-vehicle and a traction-wheel loosely mounted thereon, of a drum secured to the wheel, a number of friction-shoes with reversely-arranged toggle-joint connections between the shaft and the shoes, each shoe being rigidly secured to the adjoining member of its toggle-joint, and means for positively withdrawing either or both sets of shoes from engagement with the drum.

9. In a compensating mechanism, the combination with a one-piece solid axle, and a traction-wheel loosely mounted on each end thereof; of a compensating clutch between each wheel and the axle, comprising a drum secured to the wheel, reversely-arranged friction-shoes and toggle-joint connections between the shoes and the axle, each shoe being made integral with the adjoining member of the toggle-joint, means for forcing either set of shoes into engagement with the drum, and means for positively withdrawing either set therefrom.

10. In a compensating mechanism, the combination with a one-piece solid axle of a motor-vehicle, and a tracton-wheel loosely mounted on each end thereof, of a compensating clutch mechanism between each wheel and the axle, comprising two reversely-arranged pairs of friction-shoes and toggle-joint connections between said shoes and the axle, each shoe being made integral with the adjoining member of the toggle-joint, and the members of each pair of shoes and toggle-joints being disposed in diametrical opposition to each other, springs for drawing the shoes into engagement with the drum, and operating-levers for positively withdrawing either one or both of said pairs from engagement therewith.

11. The combination with a solid one-piece axle of a motor-vehicle, and a traction-wheel loosely mounted on each end thereof; of a drum secured to each wheel, a hub secured to the axle for each wheel, two pairs of oppositely-disposed friction-shoes, an arm between each shoe and the hub and said arm and shoe being integrally formed, the inner end of each arm being pivoted to the hub so as to permit the arm to move in a plane at right angles to the axle, the pivotal points being slightly off center so as to tend to force the shoes into engagement with the drum, this arrangement being reversely arranged for the two pairs, an operating-lever for each shoe extending away from the hub, a grooved sleeve to operate said levers respectively, and means for shifting the sleeve on the shaft.

12. In a compensating mechanism for automobiles, the combination with the drive-shaft of an automobile and a traction-wheel loosely mounted on each end of said shaft; of a compensating mechanism between each traction-wheel and the shaft comprising a drum secured to the wheel, reversely-arranged friction-shoes and toggle-joint connections between the shoes and the axle, means for forcing either set of shoes into engagement with the drum, and means for positively withdrawing either set therefrom.

13. In a compensating friction mechanism for automobiles, the combination with the main drive-shaft and a traction-wheel loosely mounted on each end thereof; of a compensating mechanism between each traction-wheel and the drive-shaft comprising a drum rigidly secured to the wheel, reversely-arranged friction-shoes and toggle-joint connections between the shoes and the axle, means for forcing either set of friction-shoes into engagement with the drum, and means for positively withdrawing either or both of said sets from engagement therewith.

14. In a compensating mechanism for automobiles, the combination with the solid drive-shaft of the automobile and the two traction-wheels, one loosely mounted on each end of said drive-shaft; of a friction clutch mechanism between the shaft and each wheel comprising reversely-arranged toggle-joints and friction-shoes, and means for operating same, substantially as set forth.

In testimony whereof we have hereunto signed our names in the presence of subscribing witnesses.

LAFAYETTE M. OSBORN.
JAMES E. MANNIS.

Witnesses:
  Z. T. FISHER,
  C. J. ROSEN.